(12) United States Patent
Bair et al.

(10) Patent No.: US 6,869,998 B2
(45) Date of Patent: Mar. 22, 2005

(54) CONCRETE OR CEMENT DISPERSANT AND METHOD OF USE

(75) Inventors: Keith A. Bair, Pennsburg, PA (US); Arpad Savoly, Martinsville, NJ (US); Bennie Veal, Rome, GA (US)

(73) Assignee: GEO Specialty Chemicals, Inc., Cleveland, OH (US)

( * ) Notice: Subject to any disclaimer, the term of this patent is extended or adjusted under 35 U.S.C. 154(b) by 0 days.

(21) Appl. No.: 10/602,405

(22) Filed: Jun. 23, 2003

(65) Prior Publication Data

US 2004/0259982 A1 Dec. 23, 2004

(51) Int. Cl.$^7$ .............................................. C08F 220/02
(52) U.S. Cl. .......................... 524/556; 524/5; 524/609; 526/221; 526/222; 526/223; 526/328.5
(58) Field of Search ............................. 524/5, 556, 609; 526/221, 222, 223, 328.5

(56) References Cited

U.S. PATENT DOCUMENTS

| | | | |
|---|---|---|---|
| 4,457,762 A | 7/1984 | Papalos et al. | |
| 4,457,874 A | 7/1984 | Papalos et al. | |
| 4,479,826 A | 10/1984 | Papalos et al. | |
| 4,652,621 A * | 3/1987 | Kadono et al. | 526/262 |
| 4,674,574 A | 6/1987 | Savoly et al. | |
| 4,711,731 A | 12/1987 | Garvey et al. | |
| 4,741,843 A | 5/1988 | Garvey et al. | |
| 4,744,795 A | 5/1988 | Savoly et al. | |
| 4,814,389 A | 3/1989 | Garvey et al. | |
| 4,870,120 A * | 9/1989 | Tsubakimoto et al. | 524/5 |
| 5,158,612 A | 10/1992 | Savoly et al. | |
| 5,714,001 A | 2/1998 | Savoly et al. | |
| 5,753,744 A | 5/1998 | Darwin et al. | |
| 5,798,425 A | 8/1998 | Albrecht et al. | |
| 6,174,980 B1 | 1/2001 | Hirata et al. | |
| 6,176,921 B1 | 1/2001 | Kinoshita et al. | |
| 6,239,241 B1 | 5/2001 | Yamato et al. | |
| 6,264,739 B1 | 7/2001 | Yamato et al. | |
| 6,451,881 B1 | 9/2002 | Vickers, Jr. et al. | |
| 6,454,850 B2 | 9/2002 | Yamashita et al. | |
| 6,462,014 B1 | 10/2002 | Johnson et al. | |
| 6,486,260 B1 | 11/2002 | Yuasa et al. | |
| 2003/0052303 A1 * | 3/2003 | Buentello et al. | 252/175 |

* cited by examiner

*Primary Examiner*—David W. Wu
*Assistant Examiner*—Satya Sastri
(74) *Attorney, Agent, or Firm*—Rankin, Hill, Porter & Clark LLP

(57) ABSTRACT

A dispersant for use with concrete or cement, and a concrete or cement admixture that comprises a cementitious material, water, and the dispersant. The dispersant includes a polymeric derivative of carboxylic acid, and has a sulfur-containing moiety that is covalently bonded thereto. Adding the dispersant to the cementitious material and water improves the rheological properties of the admixture.

7 Claims, No Drawings

CONCRETE OR CEMENT DISPERSANT AND METHOD OF USE

BACKGROUND OF THE INVENTION

1. Field of the Invention

The present invention provides generally a concrete or cement dispersant and a method of using the dispersant. Specifically, the present invention provides a cement or concrete dispersant having a covalently bonded sulfur moiety.

2. Discussion of Related Art

Workability and durability of cement and concrete (hereinafter "concrete") are important parameters for concrete structures. Dispersants have been used to improve both workability and durability of the cement used to make the concrete structures. Dispersants are also known as fluidity modifiers or slump modifiers and are introduced into freshly mixed concrete to improve the workability of the concrete while reducing the amount of water needed for purposes of transportation, pouring and placing the concrete.

Current dispersants include naphthalene-based dispersants, aminosulfonic acid based dispersants, and polycarboxylic acid based dispersants. These dispersants improve the slump properties or flow characteristics of the concrete. Slump loss is still a persistent problem encountered in the field. A delay in the delivery of the concrete to a worksite or a variation in ambient temperature can negatively impact the concrete and decrease the slump. Any advantages to using the dispersant may be lost.

Carboxylate salts can be formed in several ways. Non-polar, polar and ionic bonding types are available for functional groups to attach to a carboxylate group to form a salt. The bonding type strongly affects such properties as the water solubility of the resultant molecule. Further, the choice of cation affects such properties as the water solubility. As noted above, ionic and non-ionic polymers have been used as concrete dispersants. As used herein ionic refers to radicals having separated charges, and includes both anionic polymers and to a lesser extent cationic polymers. Non-ionic, as used herein, refers to hydrogen bonding, or bonding via Van der Waals forces. Accordingly, anionic and non-ionic polymers conventionally used as dispersants do not have covalently bonded sulfate moieties.

While current dispersants improve the slump properties of the concrete, often the amount of dispersant necessary to achieve a predetermined level or degree of slump is greater than is desirable. There still exists a need for a dispersant that improves slump properties of freshly mixed concrete.

SUMMARY OF THE INVENTION

The present invention provides a concrete or cement admixture that is made from a cementitious material, water, and a dispersant. The dispersant includes a polymeric derivative of carboxylic acid. Suitable alternatives can be derived from amido carboxylic acid, C1–C6 alkyl ester of carboxylic acid, C1–C6 alkyl ester of amido carboxylic acid, hydroxylated C1–C6 alkyl ester of carboxylic acid, and hydroxylated C1–C6 alkyl ester of amido carboxylic acid. The dispersant includes a sulfur-containing moiety that is covalently bonded thereto. Adding the dispersant to the cementitious material and water improves the rheological properties of the admixture.

In another aspect, the present invention provides both for the dispersant described hereinabove, a method of making the dispersant, and a method of making cement or concrete using the dispersant, water and a cementitious material.

DETAILED DESCRIPTION OF PREFERRED EMBODIMENTS

The present invention provides a composition or dispersant for use with cement, cementitious material, and concrete (collectively, "concrete"), a method of making the dispersant, a concrete admixture including the dispersant, and a method of producing the admixture. The dispersant is added to freshly mixed concrete to disperse and to adjust the rheological properties of the admixture. The addition of the dispersant improves, for example, the slump life of the admixture.

In a preferred embodiment, the cementitious material is, for example, Portland cement. Suitable alternative cementitious materials include powdered inorganic and organic substances, for example clays, porcelain slips, silicate meals, chalk, carbon black, powdered rock, pigments, talc, synthetic material powders and hydraulic binding agents.

The dispersant is generally a polymeric dispersant having a sulfate group or a sulfur moiety that is covalently bonded to the polymer backbone through an oxygen atom (e.g., $C\text{—}O\text{—}S\text{—}O_3$), as distinguished from a sulfonate group, which is bonded through a carbon atom ($C\text{—}S\text{—}O_3$). The polymer backbone is preferably a polycarboxylate polymer or a carboxylate derivative polymer.

In a preferred embodiment, a dispersant according to the invention is polymerized from monomer units A and B. Generally, unit A is a repeating unit after polymerization of a carboxylate or carboxylate derivative. Preferably, unit A is a polymeric derivative of carboxylic acid, amido carboxylic acid, C1–C6 alkyl ester of carboxylic acid, C1–C6 alkyl ester of amido carboxylic acid, hydroxylated C1–C6 alkyl ester of carboxylic acid, or hydroxylated C1–C6 alkyl ester of amido carboxylic acid. Unit A can be derived from acrylic acid, methacrylic acid, acrylamide, maleic acid, maleic anhydride, fumaric acid, itaconic acid, 2-acrylamido-2-methylpropanesulfonic acid, or a water-soluble salt thereof.

Generally, unit B is a repeating unit after polymerization of a monomer having a sulfate group covalently bonded thereto, for example Allyloxypolyethyleneglycol ammonium sulfate (APES-n), where n is an integer in a range of from about 1 to about 150. Unit B can be prepared by ethoxylation, propoxylation, or a combination of the two, of allyl alcohol followed by an addition of sulfamic acid, which produces a sulfate terminated end group. Preferably, monomer units A and B each are present in the polymerization product a number of repeating units in range of from about 2 to about 200,000 repeat units.

In another preferred embodiment, the dispersant is a polymer formed from the monomers A, B and C. Monomer unit C preferably has the formula (I) and a number of polymerized repeating units in range of from about 2 to about 200,000 repeat units. A repeat unit is the number of times the polymerization product contains a unit derived from the corresponding monomer unit. That is, a repeat unit of 2 for monomer C indicates that the polymer contains about two instances of a repeating unit derived from monomer C.

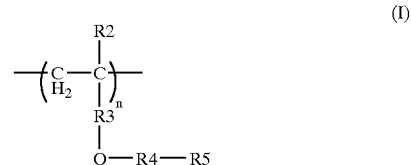

(I)

R2 is hydrogen or C1–C4 alkyl; R3 is methyl or C=O; R4 is $(CH_2\text{—}CH_2\text{—}O)_n$, $(CH_2\text{—}CH(CH_3)\text{—}O)_n$, or a combination thereof. n is an integer in a range of from about 1 to about 150. R5 is hydrogen, C1–C18 alkyl, or $M''(SO_3)$, where M" is a water-soluble cation.

Monomer unit C generally derived by the ethoxylation, propoxylation, or a combination of the two, of allyl alcohol.

Where 'm' represents the number of moles of alkoxylating agent added to each mole of allyl alcohol. In preferred embodiments of the present invention, unit C is polyethylene glycol allyl ether (PEGAE) when: R2 and R5 are hydrogen, R3 is $CH_2$, and R4 is $(CH_2-CH_2-O)$. Unit C is preferably polypropylene glycol allyl ether (PPGAE) when: R2 and R5 are hydrogen, R3 is $CH_2$, and R4 is $(CH_2-CH(CH_3)-O)$. Unit C is preferably polyethylene glycoll-polypropylene glycol allyl ether (PEGPGAE) when: R2 and R5 are hydrogen, R3 is $CH_2$, and R4 is $(CH_2-CH_2-O-CH_2-CH(CH_3)-O)$. Unit C is preferably Hydroxyethyene glycol methylmethacrylate (HEME) when: R2 is $CH_3$, R3 is $C=O$, R4 is $(CH_2-CH_2-O)$, and R5 is hydrogen. Unit C is preferably Methoxyethyene glycol methylmethacrylate (MEME) when: R2 is $CH_3$, R3 is $C=O$, R4 is $(CH_2-CH_2-O)$, and R5 is $CH_3$ or methyl.

In a preferred embodiment, the molar ratio of monomeric units (A:B:C) is in a range of from about 1 to about 10 for unit A, from about 1 to about 4 for unit B, and from about 0 to about 10 for unit C. More preferably, the molar ratio of monomeric units A:B:C is in a range of from about 2.5 to about 6 for unit A, from about 0.1 to about 2 for unit B, and from about 0 to about 3 for unit C.

A preferable dispersant according to the invention has the formula (II):

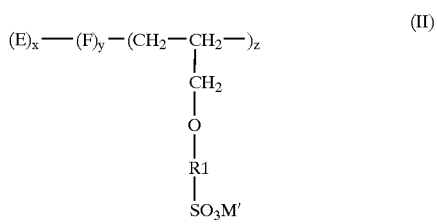
(II)

where unit E is a repeating unit after polymerization of a carboxylic acid or derivative thereof, and X is a number in range of from about 2 to about 200,000 repeat units, Y is a number in range of from about 2 to about 200,000 repeat units, Z is a number in range of from about 2 to about 200,000 repeat units; and unit F has the formula (III),

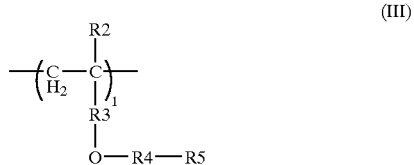
(III)

where R2 is hydrogen or C1–C4 alkyl, and R3 is $CH_2$ or $-C=O$, R3 is $CH_2$ or $C=O$,
R4 is $(CH_2-CH_2-O)_n$ or

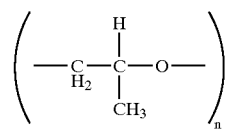

or a combination thereof, and n is an integer in a range of from about 1 to about 150, R5 is hydrogen, C1–C18 alkyl, or $M''(SO_3)$, where M'' is a water-soluble cation; R1 is $(-CH_2-CH_2-O-)_n$ or

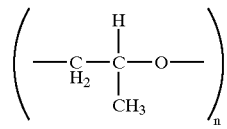

or a combination thereof, and n is an integer in a range of from about 1 to about 150.

Generally, unit E is derived from a composition selected from the group consisting of carboxylic acid, amido carboxylic acid, C1–C6 alkyl ester of carboxylic acid, C1–C6 alkyl ester of amido carboxylic acid, hydroxylated C1–C6 alkyl ester of carboxylic acid, and hydroxylated C1–C6 alkyl ester of amido carboxylic acid. In particular, unit E can be derived from a composition selected from the group consisting of acrylic acid, methacrylic acid, acrylamide, maleic acid, maleic anhydride, fumaric acid, itaconic acid, 2-acrylamido-2-methylpropanesulfonic acid, and water-soluble salts thereof.

R1 is $(CH_2-CH_2-O)_n$ or

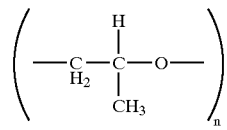

or a combination thereof, where n is an integer in a range of from about 1 to about 150, preferably about 100. M' is a water-soluble cation. Preferably, M' and M'' are sodium, potassium, calcium, or ammonium. In alternative embodiments according to the invention, M' and M'' are the same or different from each other.

M' and M'' are the same or different from each other, and are preferably water-soluble cations. Particularly suitable cations include sodium, potassium, calcium, and ammonium. In alternative embodiments, M' and M'' are the same or different from each other, and are organic amines, such as triethylamine (TEA), morpholine, and the like.

Polymerization of the monomers may proceed in accordance with conventional solution, precipitation or emulsion polymerization techniques. Conventional polymerization initiators such as azo compounds, persulfates, peroxides, UV light, and the like may be used. Chain transfer agents such as alcohols (preferably isopropanol), amine, hypophosphites or mercapto compounds may be used to regulate or control the molecular weight of the polymer. The monomer backbone preferably consists of a random combination of the monomers dependent upon their reactivity ratios. The resulting polymer may be isolated by common isolation techniques including precipitation isolation and the like. If polymerization is carried out in water, the polymer may simply be used in its aqueous solution.

Generally, the dispersant according to the invention is added in predetermined levels to cement based compositions, such as, but not limited to, concrete ad-mixtures, mortar, and the like. The addition of the polymer preferably improves both the fluidity and handling life of these compositions to which the polymer is added. Specifically, the dispersant used in accordance with the present invention is added into a mixture of cementitious material and water in an amount in a range of about 0.1 percent (weight/weight) to about 1.0 percent (w/w), and preferably in an amount in a range of from about 0.2 to about 0.32 percent (w/w).

The polymers or dispersants are particularly useful as the dispersing and water reducing agents in self-consolidating concrete. Also, the polymers can be used in the oilfield industry as dispersants for oil well cementing. Additionally, the polymers can be used in the gypsum industry as dispersants or water reducing agents. Further, these polymers can be used to disperse SBR and NBR emulsion rubbers during polymerization and processing of the rubber.

The copolymers or dispersants according to the invention also find utility in other applications. These applications include, but are not limited to, metal pre-treatment, and cooling and boiler water treatment applications.

EXAMPLES

The following examples are intended only to illustrate methods and embodiments in accordance with the invention, and as such should not be construed as imposing limitations upon the claims. Unless specified otherwise, all ingredients and equipment pieces are commercially available from such common commercial suppliers as Sigma Aldrich, Inc. (St. Louis, Mo.) and/or Fisher Scientific International, Inc. (Hanover Park, Ill.). Allyloxypolyethyleneglycol ammonium sulfate (APES) monomers are commercially available from Bimax, Inc. (Cockeysville, Md.), and Polyethylene glycol allyl ether (PEGAE) monomers are commercially available both from Bimax, Inc. and from Rhodia, Inc., (Cranbury, N.J.).

Generally, EXAMPLES 1–26 were prepared as described in TABLE 1. The legend for the abbreviations used in TABLE 1 is found in TABLE 2.

Example 1

Preparation of Acrylic Acid/Allyloxypolyethylene glycol Sulfate, Ammonium Salt (APES-10) Copolymer Ratio 3.0/1.0.

A suitable flask was equipped with a condenser, an addition funnel, a mechanical stirrer, a thermometer and a nitrogen sparger. The flask was charged with 46.3 g of APES-10 (0.075 mole @ 95%) and 90 g of deionized water. 16.2 g of acrylic acid (0.225 mole @ 99%) was charged to a 20 cc syringe and placed on a syringe pump. 9.12 g of a 16.6% solution of sodium persulfate was charged to a separate syringe and placed on a separate syringe pump. The solution was sparged with nitrogen and heated to 85° C. The acrylic acid and initiator solution were charged simultaneously over three hours. The resulting polymer solution was heated for one more hour at 85° C. then cooled to room temperature. Caustic (50%) was then added to adjust the pH to 6.4.

The polymer solution was characterized as a clear, light yellow solution. After diluting the solution to 25% solids, a Brookfield viscosity of 31.7 cps was recorded.

Examples 2–13

Procedures similar to the procedures used in EXAMPLE 1 were used to prepare various copolymers of (meth)acrylic acid with various sulfated allylic monomers with different mole ratios and degrees of ethoxylation. The parameters and results are shown in TABLE 1.

Example 14

Preparation of Acrylic Acid/ Allyloxypolyethyleneglycol Sulfate Ammonium Salt (APES-10)/Allyloxypolyethyleneglycol (PEGAE-10) having a terpolymer ratio or 3.0/0.5/ 0.5.

Utilizing an apparatus as described in EXAMPLE 1, 21.92 g of APES-10 (0.035 mole @ 95%), 17.45 g of PEGAE-10 (0.035 mole) and 78.44 g of deionized water were charged to the flask. 15.14 g of acrylic acid (0.21 mole) was charged to a 20 cc syringe and placed on a syringe pump. 5.86 g of a 20% solution of sodium persulfate was charged to a separate syringe and placed on a separate syringe pump. The solution was sparged with nitrogen and heated to 85° C. The acrylic acid and initiator solution were co-fed over three hours. The resulting polymer solution was heated for one more hour at 85° C. then cooled to room temperature. Caustic (50%) was then added to adjust the pH to 5.3.

The polymer solution was characterized as a clear, light yellow solution. After diluting the solution to 25% solids, a Brookfield viscosity of 31.5 cps was recorded.

Examples 15–26

Similar procedures were used to prepare various terpolymers of (meth)acrylic acid with various sulfated allylic monomers and PEGAE monomers with different mole ratios and degrees of ethoxylation. The parameters and results are shown in TABLE 1. Some of these samples were verified by 13-C NMR. The corresponding spectra were characterized by a broad polyacrylic acid type backbone. Strong resonances at 61, 70 and 72 ppm correspond to the polyethylene glycol moiety and a broad carbonyl region (179–184 ppm). A very low level (<3%) of unreacted allylic monomer was detected in some of the samples.

Efficacy Testing was performed according to the following Cement Mini-slump testing procedure:

100 grams (g) of Type 1 Portland cement was added to a disposable beaker. 35 g water was added to the beaker and the cement and water was mixed for 30 seconds with a metal spatula to produce a slurry. The dispersants of this invention were dosed via a disposable syringe into the cement slurry. The slurry was mixed for an additional 30 seconds. The cement slurry was poured into a mini-slump cone, which was sitting on a glass plate. The mini-slump cone was then filled to the top with the cement slurry and then the mini-slump cone was lifted quickly and evenly from the glass plate, allowing the cement slurry to flow onto the glass plate. The diameter of the cement slurry patty thus formed was measured. The measurement was the initial slump diameter. The material was returned to the disposable beaker, then re-mixed and measured every 30 minutes to monitor slump retention.

Reference is made to the "Standard Test Method for Slump of Hydraulic Cement Concrete" ASTM C143-97, Vol. 04.02, which is hereby incorporated by reference in its entirety. Additional information regarding the mini-slump test is found in D. L. Kantro's, *Influence of Water-Reducing Admixtures on Properties of Cement Paste*—A Miniature Slump Test, Cement, Concrete and Aggregates, 2. (1980) pages 95–102, the entire contents of which is hereby incorporated by reference.

TABLE 1

Ratios and properties of examples.

| EXAMPLE NUMBER | POLYMER COMPOSITION | COPOLYMER RATIO | % SOLIDS | VISCOSITY (cps) | pH |
| --- | --- | --- | --- | --- | --- |
| 1 | AA/APES-10 | 3/1 | 24.3 | 31.7 | 5.4 |
| 2 | AA/APES-10 | 3/1 | 24.1 | 21.8 | 5.8 |
| 3 | AA/APES-20 | 2.5/1 | 25.2 | 12.3 | 5.5 |

TABLE 1-continued

Ratios and properties of examples.

| EXAMPLE NUMBER | POLYMER COMPOSITION | COPOLYMER RATIO | % SOLIDS | VISCOSITY (cps) | pH |
|---|---|---|---|---|---|
| 4 | AA/APES-20 | 3/1 | 23.7 | 18.7 | 5.2 |
| 5 | AA/APES-20 | 4/1 | 23.6 | 21.0 | 5.1 |
| 6 | AA/APES-20 | 5.6/1 | 25.6 | 65.9 | 5.9 |
| 7 | AA/APES-20 | 8.9/1 | 23.1 | 8850 | 6.4 |
| 8 | AA/APES-50 | 3/1 | 24.6 | 19.3 | 4.1 |
| 9 | AA/APES-50 | 3/1 | 24.6 | 14.8 | 4.6 |
| 10 | AA/APE5-P5-S | 3/1 | 24.2 | 13.0 | 5.5 |
| 11 | AA/AAE5-P5 | 3/1 | 24.8 | 11.0 | 6.0 |
| 12 | MAA/AAE-5-P5 | 3/1 | 25.2 | 10.6 | 6.4 |
| 13 | MAA/AA/APES-10 | 1.5/1.5/1 | 24.0 | 31.2 | 6.1 |
| 14 | AA/APES-10/PEGAE-10 | 3/0.5/0.5 | 23.8 | 31.5 | 5.4 |
| 15 | AA/APES-20/PEGAE-20 | 3/0.5/0.5 | 25.1 | 20.3 | 5.5 |
| 16 | AA/APES-50/PEGAE-50 | 3/0.5/0.5 | 24.6 | 16.5 | 4.9 |
| 17 | AA/APES-20/PEGAE-50 | 3/0.5/0.5 | 25.0 | 14.0 | 5.1 |
| 18 | AA/APES-20/PEGAE-20 | 3/0.27/0.5 | 23.7 | 19.0 | 6.0 |
| 19 | AA/APES-20/PEGAE-20 | 3/0.27/0.5 | 25.7 | 50.5 | 6.1 |
| 20 | AA/APES-20/PEGAE-60 | 3/0.5/0.5 | 24.9 | 18.3 | 5.2 |
| 21 | AA/APES-20/PEGAE5-P5 | 3/0.5/0.5 | 24.8 | 14.2 | 5.5 |
| 22 | AA/AAE5, P5S/PEGAE-50 | 3/0.5/0.5 | 24.7 | 17.1 | 5.2 |
| 23 | AA/APES-20/PEGAE-100 | 3/0.5/0.5 | 40.2 | 86.27 | 6.0 |
| 24 | AA/MHEM-16/APES-20 | 3/0.5/0.5 | 24.4 | 19.7 | 6.6 |
| 25 | AA/APES-20/PEGAE5-P5 | 3/0.5/0.5 | 24.3 | 14.1 | 5.8 |
| 26 | AA/APES-20/PEGAE5-P5 | 3/0.5/0.5 | 24.84 | 14.2 | 5.5 |

TABLE 2

Legend for abbreviations used in TABLE 1.

| ABBREVIATION | NAME | COMMENT |
|---|---|---|
| AA | Acrylic acid | N/a |
| MAA | Methacrylic acid | N/a |
| APES-10 | Allyloxypolyethyleneglycol ammonium sulfate | Average of 10 moles of ethylene oxide |
| APES-20 | Allyloxypolyethyleneglycol ammonium sulfate | Average of 20 moles of ethylene oxide |
| APES-50 | Allyloxypolyethyleneglycol ammonium sulfate | Average of 50 moles of ethylene oxide |
| PEGAE5-P5S | Polyethylene glycol allyl ether | Average of 5 moles of ethylene oxide and 5 moles propylene oxide |
| PEGAE-10 | Polyethylene glycol allyl ether | Average of 10 moles of ethylene oxide |
| PEGAE-20 | Polyethylene glycol allyl ether | Average of 20 moles of ethylene oxide |
| PEGAE-50 | Polyethylene glycol allyl ether | Average of 50 moles of ethylene oxide |
| PEGAE-60 | Polyethylene glycol allyl ether | Average of 60 moles of ethylene oxide |
| PEGAE-100 | Polyethylene glycol allyl ether | Average of 100 moles of ethylene oxide |
| MHEM16 | Methoxypolyethyleneglycol monomethacrylate | Average of 16 moles of ethylene oxide |

TABLE 3

Results of mini-slump testing.

| EXAMPLE NUMBER | DISPERSANT PERCENTAGE | DIAMETER in CENTIMETERS (cm) | | | | |
|---|---|---|---|---|---|---|
| | | 0 min | 30 min | 60 min | 90 min | 120 min |
| 1(a) | 0.32 | 18.0 | 8.7 | Thick | | |
| 1(b) | 0.20 | 17.7 | Thick | | | |
| 2(a) | 0.32 | 16.2 | 16.6 | 16.0 | 13.5 | 11.9 |
| 2(b) | 0.20 | 18.2 | Thick | | | |
| 3(a) | 0.32 | N/a | | | | |
| 3(b) | 0.20 | 17.3 | 12.8 | 12.5 | 12.0 | 11.2 |
| 4(a) | 0.32 | 19.3 | 21.1 | 19.0 | 16.9 | 15.0 |
| 4(b) | 0.20 | 20.9 | 11.4 | Thick | | |
| 5(a) | 0.32 | 17.0 | 18.4 | 18.6 | 18.1 | 17.6 |
| 5(b) | 0.20 | 17.8 | 9.4 | Thick | | |
| 6(a) | 0.32 | Thick | | | | |
| 6(b) | 0.20 | Thick | | | | |
| 7(a) | 0.32 | 16.5 | Thick | | | |
| 7(b) | 0.20 | 13.2 | Thick | | | |
| 8(a) | 0.32 | 18.2 | 18.9 | 18.8 | 18.7 | 18.4 |
| 8(b) | 0.20 | 16.0 | 14.0 | 13.4 | 13.3 | 12.6 |
| 9(a) | 0.32 | 17.9 | 18.1 | 18.7 | 18.0 | 17.9 |
| 9(b) | 0.20 | 15.8 | 13.7 | 13.2 | 12.9 | 12.2 |
| 10(a) | 0.32 | 19.5 | 21.0 | 21.3 | 21.0 | 19.5 |
| 10(b) | 0.20 | 20.5 | 11.7 | 10.6 | 9.5 | 7.6 |
| 11(a) | 0.32 | 21.3 | 13.4 | 11.1 | 10.5 | 9.2 |
| 11(b) | 0.20 | 20.2 | Thick | | | |
| 12(a) | 0.32 | 18.7 | Thick | | | |
| 12(b) | 0.20 | 13.5 | Thick | | | |
| 13(a) | 0.32 | 18.8 | 15.5 | 12.6 | 6.3 | Thick |
| 13(b) | 0.20 | 16.9 | Thick | | | |
| 14(a) | 0.32 | 18.1 | 17.0 | 17.8 | 17.1 | 16.6 |
| 14(b) | 0.20 | 17.6 | Thick | | | |
| 15(a) | 0.32 | 18.5 | 19.2 | 17.6 | 16.4 | 15.2 |
| 15(b) | 0.20 | 19.2 | 12.5 | 12.2 | 11.6 | 10.3 |
| 16(a) | 0.32 | 17.4 | 18.3 | 18.3 | 18.1 | 17.2 |
| 16(b) | 0.20 | 15.0 | 13.0 | 12.8 | 12.2 | 11.6 |
| 17(a) | 0.32 | 18.8 | 18.7 | 19.1 | 18.7 | 18.5 |
| 17(b) | 0.20 | 16.9 | 14.1 | 14.0 | 13.5 | 13.1 |
| 18(a) | 0.32 | 20.2 | 17.0 | 16.6 | 15.7 | 15.0 |
| 18(b) | 0.20 | 18.2 | 8.0 | Thick | | |
| 19(a) | 0.32 | 15.1 | 10.7 | Thick | | |
| 19(b) | 0.20 | 13.5 | Thick | | | |
| 20(a) | 0.32 | 21.6 | 22.0 | 22.8 | 23.0 | 22.5 |
| 20(b) | 0.20 | 20.6 | 17.9 | 17.4 | 16.9 | 16.0 |
| 21(a) | 0.32 | 18.4 | 20.7 | 21.0 | 21.4 | 20.7 |
| 21(b) | 0.20 | 20.4 | 13.7 | 12.5 | 12.3 | 11.6 |
| 22(a) | 0.32 | 17.2 | 19.2 | 20.2 | 20.8 | 20.0 |
| 22(b) | 0.20 | 18.3 | 16.3 | 15.6 | 14.9 | 14.0 |
| 23(a) | 0.32 | 17.4 | 20.7 | 20.2 | 19.9 | 19.4 |
| 23(b) | 0.20 | 18.0 | 16.0 | 15.6 | 14.9 | 14.0 |
| 24(a) | 0.32 | 16.4 | 16.8 | 16.4 | 16.0 | 14.3 |
| 24(b) | 0.20 | 18.0 | 12.4 | 7.5 | Thick | |
| 25(a) | 0.32 | 19.5 | 20.6 | 21.5 | 21.8 | 20.5 |
| 25(b) | 0.20 | 20.1 | 13.2 | 12.2 | 12.0 | 11.3 |
| 26(a) | 0.32 | 18.4 | 20.7 | 21.0 | 21.4 | 20.7 |
| 26(b) | 0.20 | 20.4 | 13.7 | 12.5 | 12.3 | 11.6 |

TABLE 4

Comparative examples

| EXAMPLE NUMBER | DISPERSANT[1] PERCENTAGE | DIAMETER in CENTIMETERS (cm) | | | | |
|---|---|---|---|---|---|---|
| | | 0 min | 30 min | 60 min | 90 min | 120 min |
| C1 | 0.32 | 17.0 | Thick | — | — | — |
| C2 | 0.35 | 16.6 | Thick | — | — | — |
| C3 | 0.70 | 19.0 | 19.2 | 18.5 | 16.0 | 14.6 |

[1]Control dispersant is Calcium naphthalene sulfonate condensate.

As is noted by comparing EXAMPLES C1–C2 with the EXAMPLES 1–26, comparable amounts of dispersant additive show effectiveness for improving the rheological properties of the Examples 1–26, but show no lasting effect for the samples C1–C2. Comparing C3 with the EXAMPLES 1–26, there is a roughly similar improvement in slump on average, but more than double the amount of the control dispersant is required to achieve the effective improvement.

The processes and embodiments described herein are examples of compositions and methods having elements corresponding to the elements of the invention recited in the claims. This written description may enable those skilled in the art to make and use embodiments having alternative elements that likewise correspond to the elements of the invention recited in the claims. The intended scope of the invention thus includes other compositions and methods that do not differ from the literal language of the claims, and further includes other compositions and methods with insubstantial differences from the literal language of the claims.

What is claimed:

1. A composition for use with cement or concrete as a dispersant, comprising:
   a polymer comprised of the polymerization product of monomer units A, B and C, wherein
      monomer unit A is a repeating unit after polymerization of a carboxylate or carboxylate derivative,
      monomer unit B is a repeating unit after polymerization comprising a sulfate end group.
      monomer unit C is selected from the group consisting of polyethylene glycol allyl ether (PEGAE), polypropylene glycol allyl ether (PPGAE), polyethylene glycol/polypropylene glycol allyl ether (PEGPGAE), hydroxyethyene glycol methylmethacrylate (HEME), and methoxyethyene glycol methylmethacrylate (MEME), and
   whereby the polymer has a sulfate end group covalently bonded thereto.

2. A polymeric composition for use with cement or concrete as a dispersant, comprising a polymer having the formula (II):

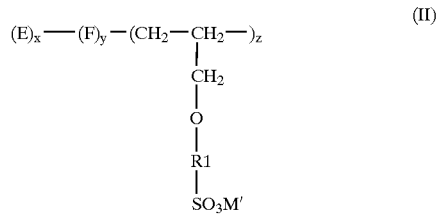

wherein E is a repeating unit after polymerization of a carboxylic acid or derivative thereof, X is a number in range of from about 2 to about 200,000 repeat units, Y is a number in range of from about 2 to about 200,000 repeat units, Z is a number in range of from about 2 to about 200,000 repeat units, wherein F is polyethylene glycol allyl ether (PEGAE) according to the formula (III),

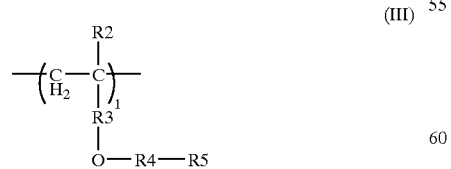

when R2 and R5 are hydrogen, R3 is $CH_2$, and R4 is ($CH_2$—$CH_2$—O), R1 is (—$CH_2$—$CH_2$—O—)$_n$ or a combination thereof, and n is an integer in a range of from about 1 to about 150, and M' is a water soluble cation or an organic amine.

3. A polymeric composition for use with cement or concrete as a dispersant, comprising a polymer having the formula (II):

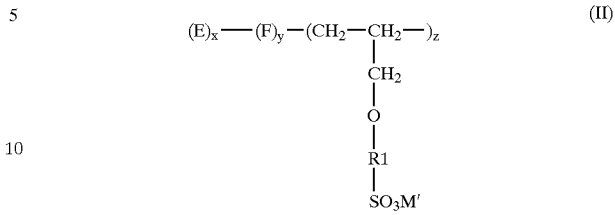

wherein E is a repeating unit after polymerization of a carboxylic acid or derivative thereof, X is a number in range of from about 2 to about 200,000 repeat units, Y is a number in range of from about 2 to about 200,000 repeat units, Z is a number in range of from about 2 to about 200,000 repeat units, wherein F is polypropylene glycol allyl ether (PPGAE) according to the formula (III),

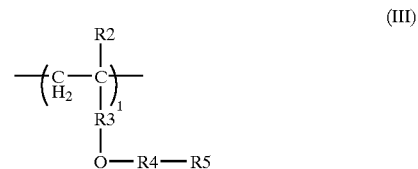

when R2 and R5 are hydrogen, R3 is $CH_2$, and R4 is ($CH_2$—CH($CH_3$)—O), R1 is (—$CH_2$—$CH_2$—O—)$_n$ or or a combination thereof, and n is an integer in a range of from about 1 to about 150, and M' is a water soluble cation or an organic amine.

4. A polymeric composition for use with cement or concrete as a dispersant, comprising a polymer having the formula (II):

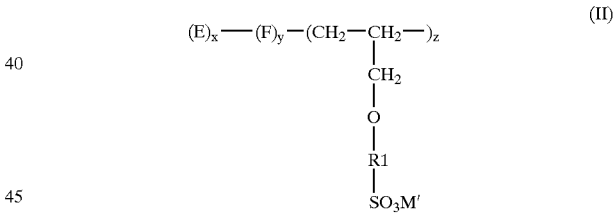

wherein E is a repeating unit after polymerization of a carboxylic acid or derivative thereof, X is a number in range of from about 2 to about 200,000 repeat units, Y is a number in range of from about 2 to about 200,000 repeat units, Z is a number in range of from about 2 to about 200,000 repeat units, wherein F is polyethylene glycol/polypropylene glycol allyl ether (PEGPGAE) according to the formula (III),

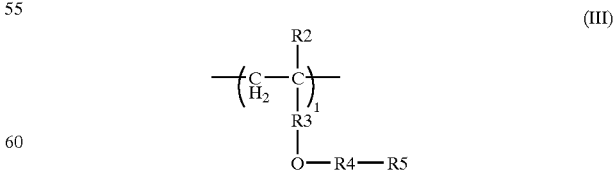

when R2 and R5 are hydrogen, R3 is $CH_2$, and R4 is ($CH_2$—$CH_2$—O—$CH_2$—CH($CH_3$)—O), R1 is (—$CH_2$—$CH_2$—O—)$_n$ or a combination thereof, and n is an integer in a range of from about 1 to about 150, and M' is a water soluble cation or an organic amine.

5. A polymeric composition for use with cement or concrete as a dispersant, comprising a polymer having the formula (II):

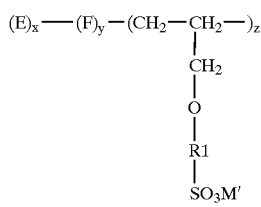

(II)

wherein E is a repeating unit after polymerization of a carboxylic acid or derivative thereof, X is a number in range of from about 2 to about 200,000 repeat units, Y is a number in range of from about 2 to about 200,000 repeat units, Z is a number in range of from about 2 to about 200,000 repeat units, wherein F is Hydroxyethylene glycol methylmethacrylate (HEME) according to the formula (III),

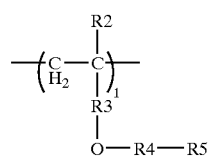

(III)

when R2 is $CH_3$, R3 is C=O, R4 is ($CH_2$—$CH_2$—O), and R5 is hydrogen, R1 is (—$CH_2$—$CH_2$—O—)$_n$ or or a combination thereof, and n is an integer in a range of from about 1 to about 150, and M' is a water soluble cation or an organic amine.

6. A polymeric composition for use with cement or concrete as a dispersant, comprising a polymer having the formula (II):

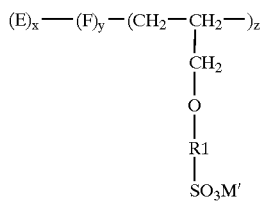

(II)

wherein E is a repeating unit after polymerization of a carboxylic acid or derivative thereof, and X is a number in range of from about 2 to about 200,000 repeat units, Y is a number in range of from about 2 to about 200,000 repeat units, Z is a number in range of from about 2 to about 200,000 repeat units, wherein F is Methoxyethylene glycol methylmethacrylate (MEME) according to the formula (III),

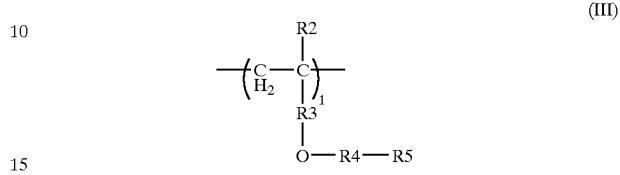

(III)

when R2 is $CH_3$, R3 is C=O, R4 is ($CH_2$—$CH_2$—O), and R5 is $CH_3$, R1 is (—$CH_2$—$CH_2$—O—)$_n$ or or a combination thereof, and n is an integer in a range of from about 1 to about 150, and M' is a water soluble cation or an organic amine.

7. A method of forming a polymeric dispersant for use in a concrete or cement admixture, comprising:

copolymerizing monomeric units A, B and C to form a polymer, wherein
monomer unit A is a repeating unit after polymerization of a carboxylate or carboxylate derivative,
monomer unit B has a sulfate end group, and
monomer unit C is selected from the group consisting of polyethylene glycol allyl ether (PEGAE), polypropylene glycol allyl ether (PPGAE), polyethylene glycol/polypropylene glycol allyl ether (PEGPGAE), hydroxyethyene glycol methylmethacrylate (HEME), and methoxyethyene glycol methylmethacrylate (MEME), and
whereby the polymer has a sulfate moiety covalently bonded thereto.

* * * * *